May 27, 1941.  E. A. EBERT  2,243,622

REMOTE CONTROL SYSTEM FOR PHONOGRAPHS AND THE LIKE

Filed Aug. 17, 1938  5 Sheets-Sheet 1

INVENTOR
Edward A. Ebert
BY
Walter P. Geyer
ATTORNEY

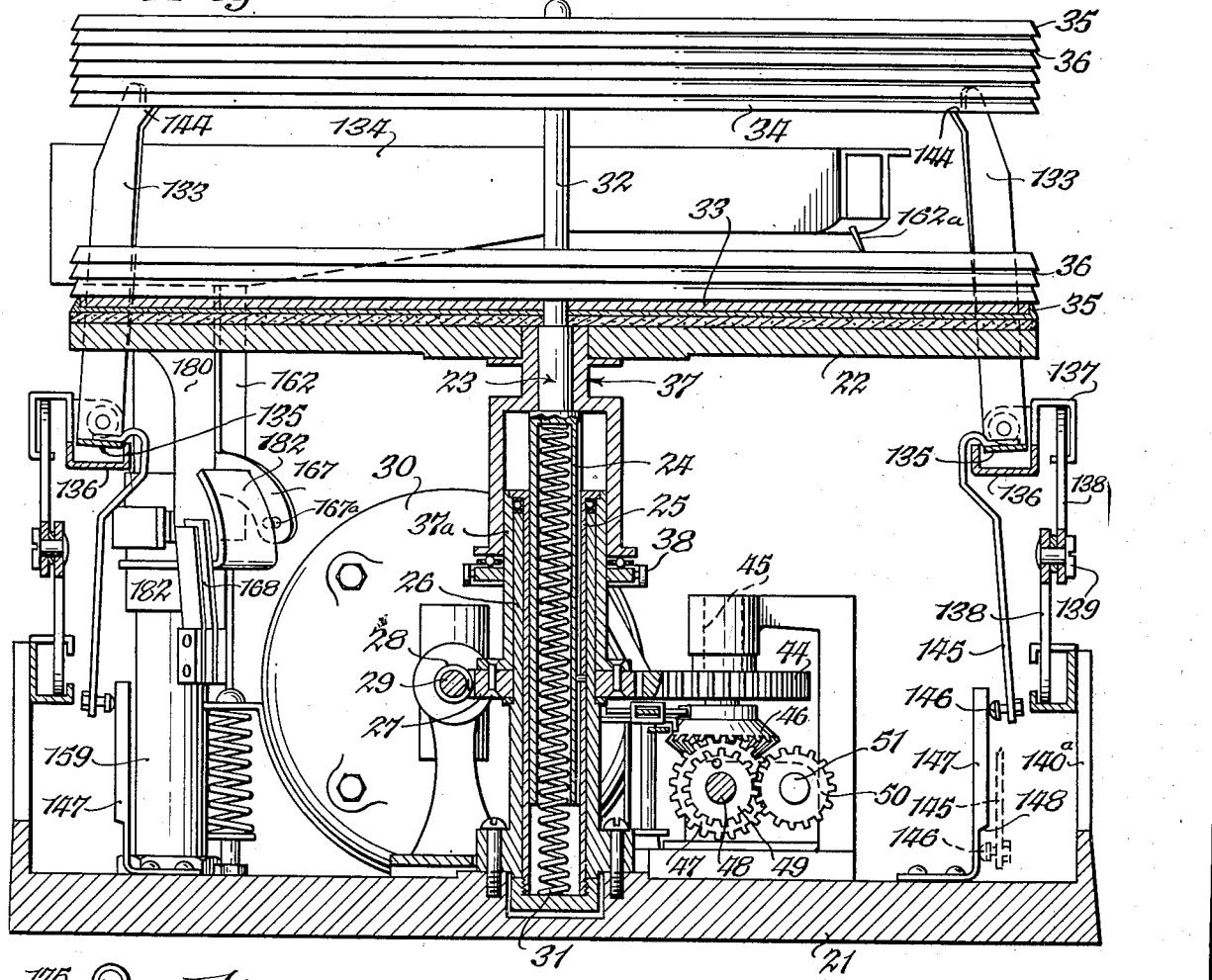
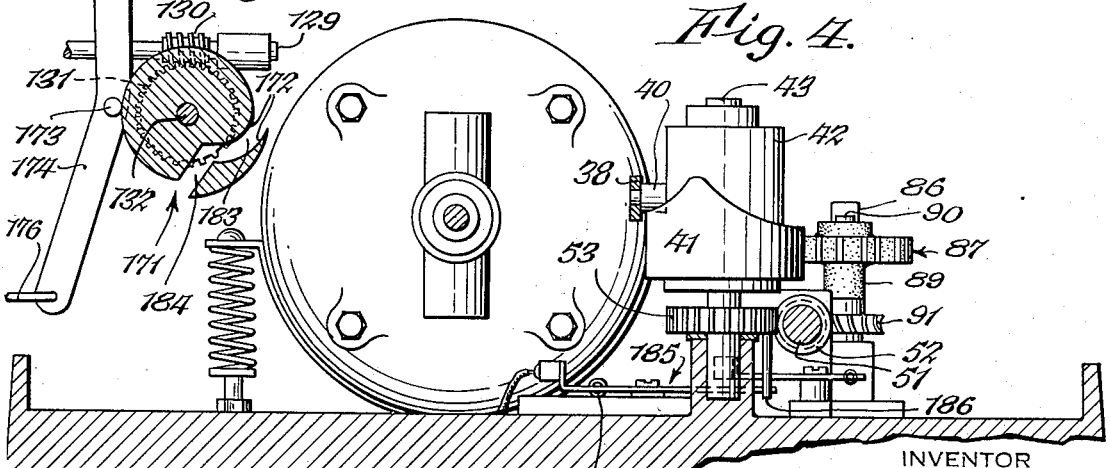

May 27, 1941. E. A. EBERT 2,243,622
REMOTE CONTROL SYSTEM FOR PHONOGRAPHS AND THE LIKE
Filed Aug. 17, 1938 5 Sheets-Sheet 3
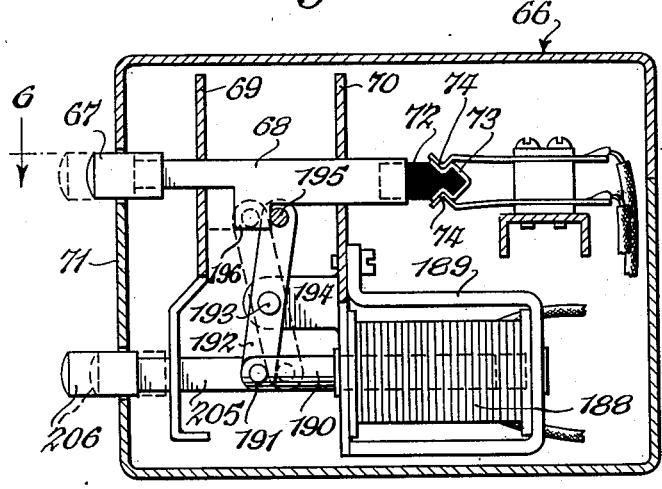
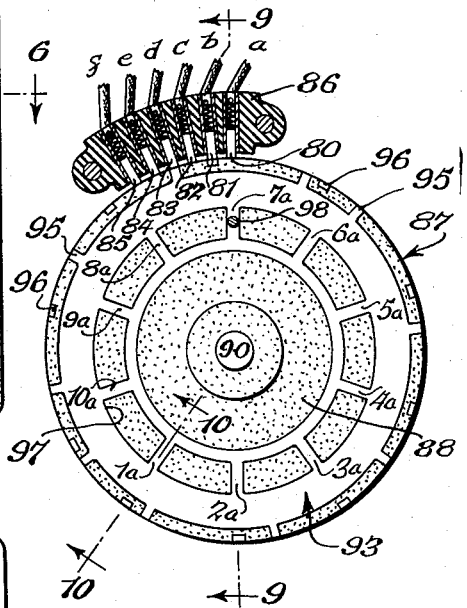
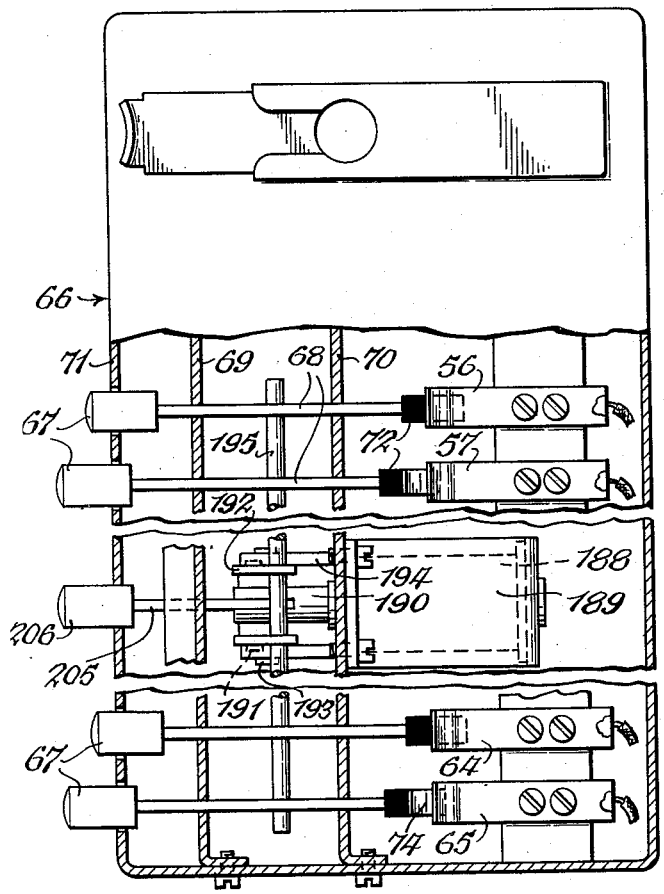
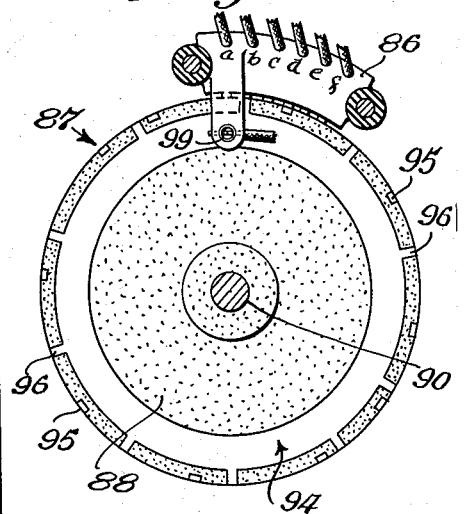
INVENTOR
Edward A. Ebert
BY
ATTORNEY

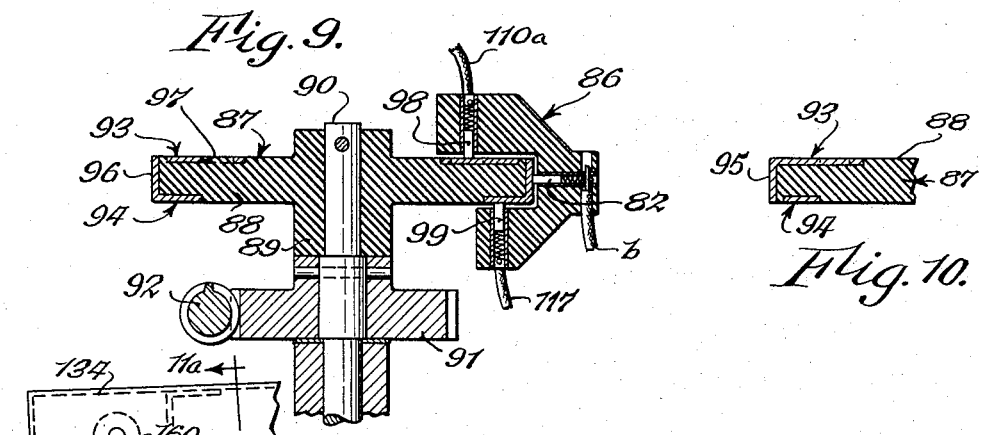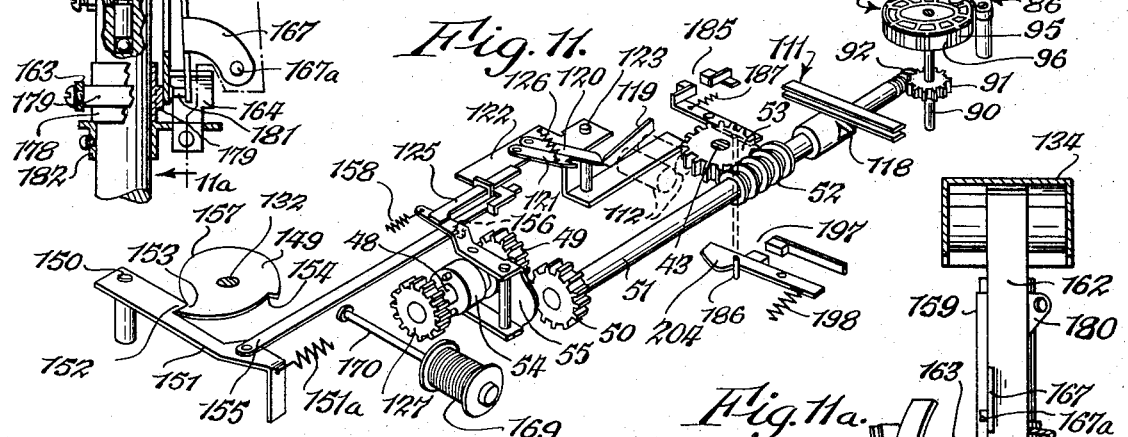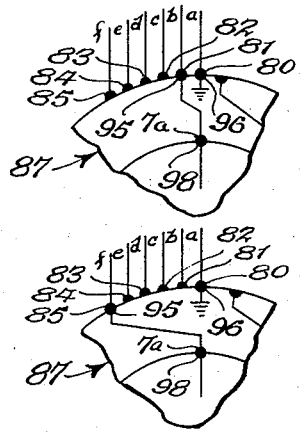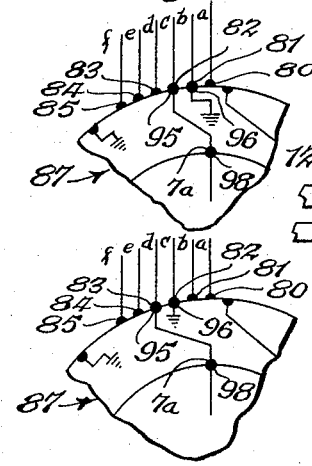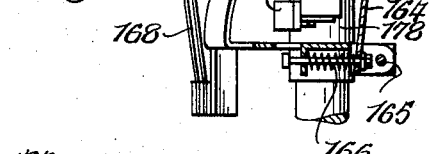

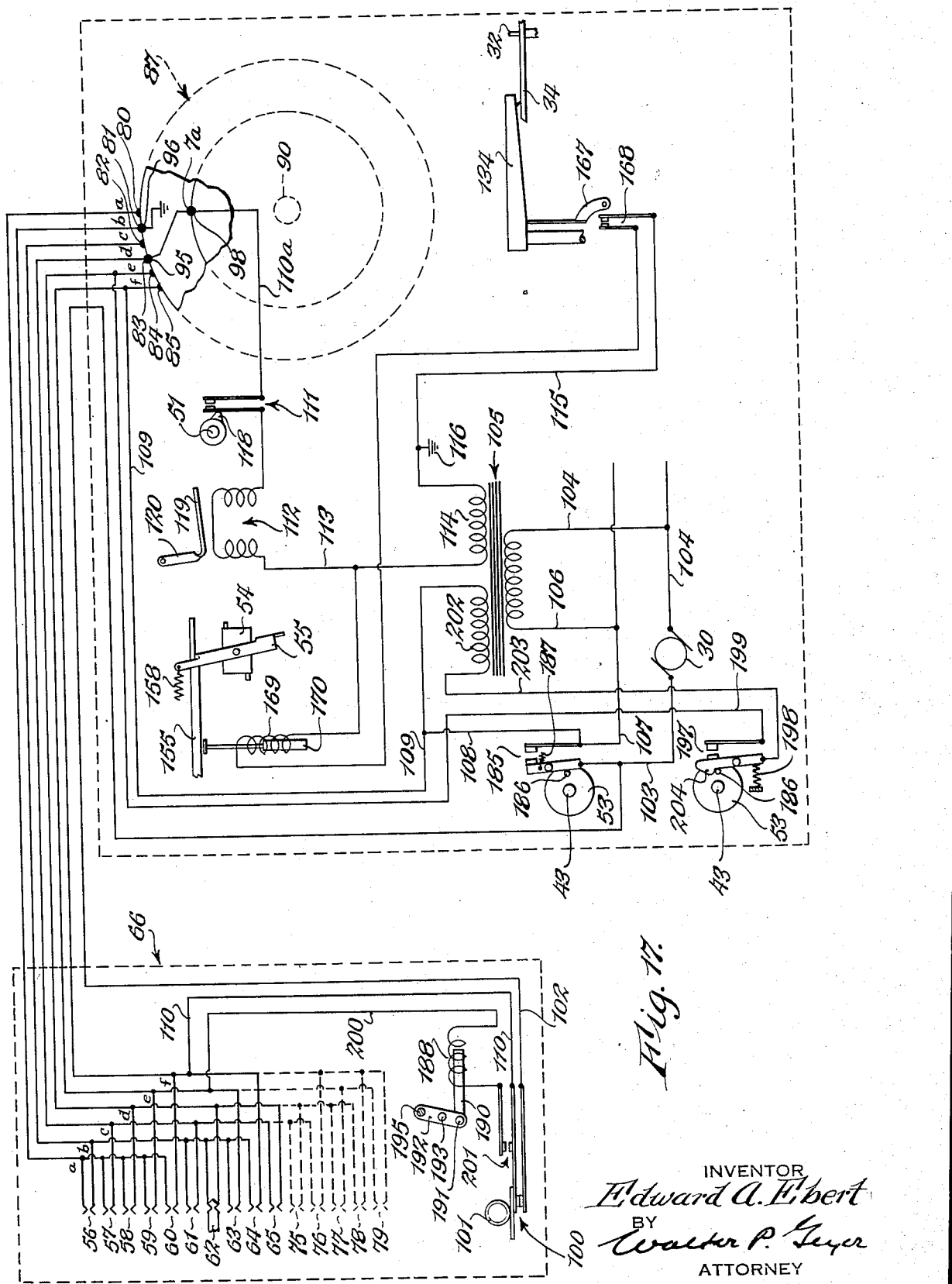

Patented May 27, 1941

2,243,622

UNITED STATES PATENT OFFICE 2,243,622

REMOTE CONTROL SYSTEM FOR PHONOGRAPHS AND THE LIKE

Edward A. Ebert, Buffalo, N. Y., assignor to The Rudolph Wurlitzer Company, North Tonawanda, N. Y., a corporation of Ohio Application August 17, 1938, Serial No. 225,492

9 Claims. (Cl. 192—142)

This invention relates to a remote control system which, although not necessarily limited to such use, is characterized by features which render it of particular utility in connection with automatic phonographs of the kind wherein provision is made for selective playing of the records.

One object of the invention is to provide a system which, when utilized for the specific purpose described, is available for the selective playing of the records from a point remote from the machine.

A further object is to provide a system which may be adapted with facility to machines having varying numbers of records.

A still further object is to provide a system which is reliable in operation and which may be applied to standard machines without substantial modification of the latter.

A still further object is to provide a novel design and arrangement of the parts of the system, whereby to reduce and simplify the wiring.

Figure 1:
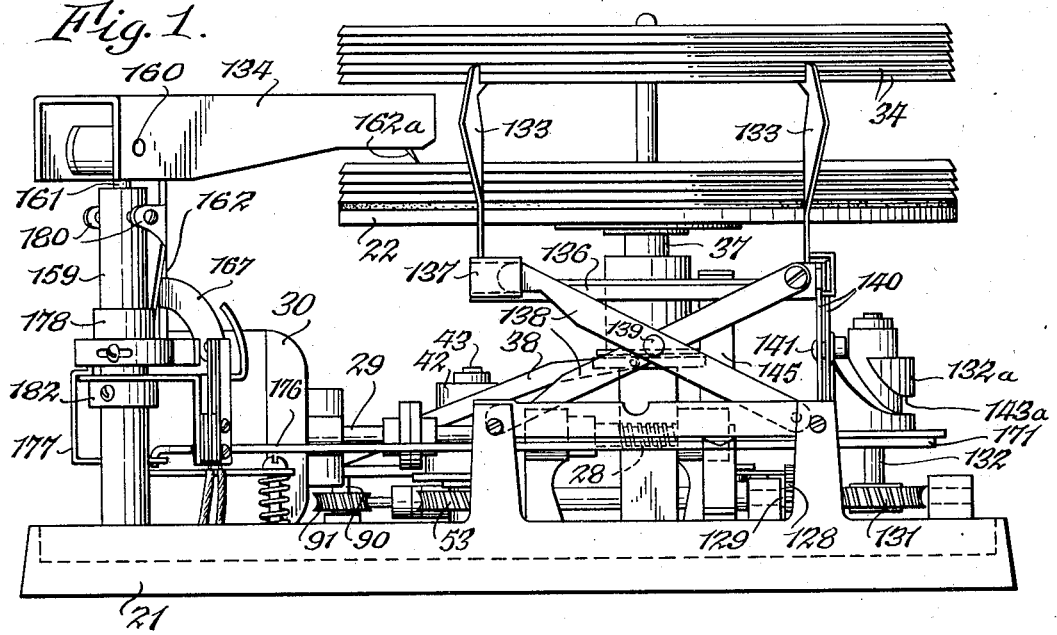
Figure 2:
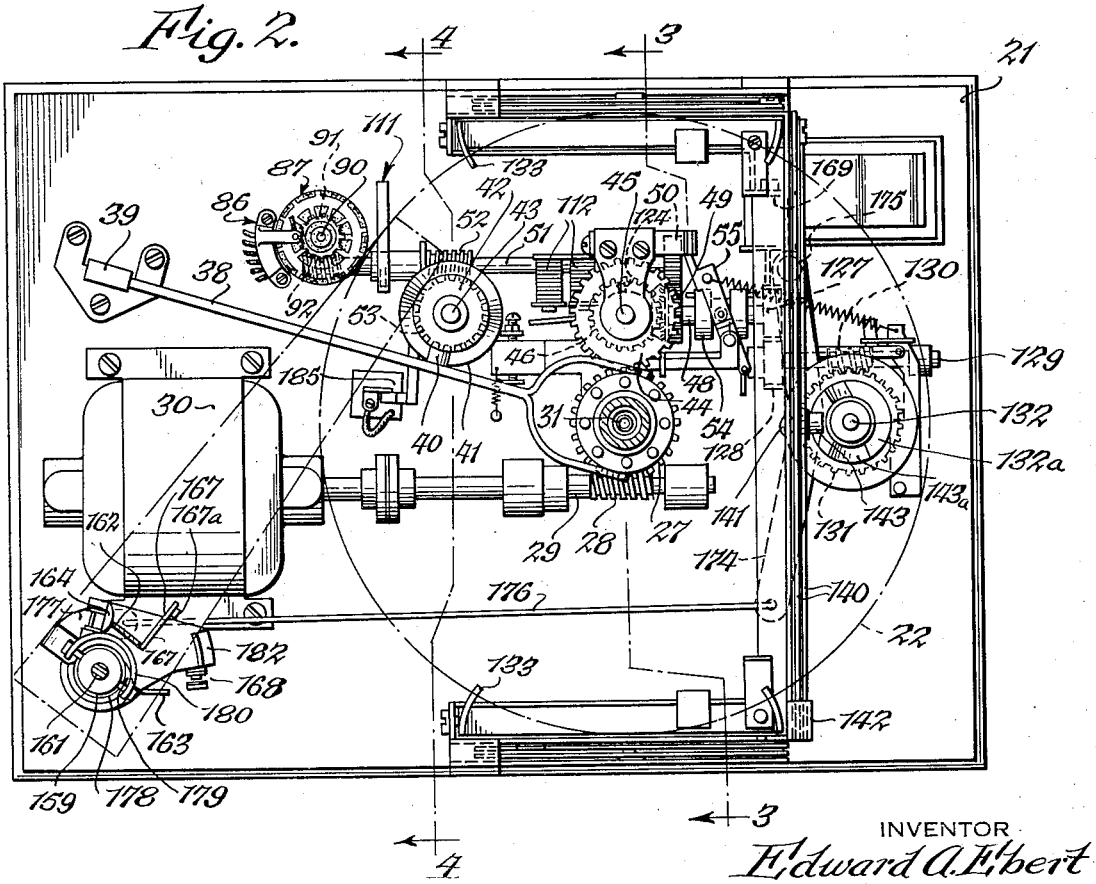

The invention is illustrated in the accompanying drawings in which:

Figure 1 is a side elevation of the automatic multi-selective phonograph with which a system embodying the features of the invention is associated. Figure 2 is a top plan view of the phonograph. Figure 3 is an enlarged transverse section taken along line 3—3, of Figure 2. Figure 4 is a similar section taken along line 4—4, of the same figure. Figure 4ª is a fragmentary view showing the cam actuating mechanism for the tone arm. Figure 5 is a section through the control box of the remote control system. Figure 6 is also a section through the said box, being taken along line 6—6 of Figure 5 and showing the box partially in elevation. Figures 7 and 8 are enlarged views of the upper and lower faces, respectively, of the rotary contactor. Figure 9 is a section through the contactor and is taken along line 9—9 of Figure 7. Figure 10 is a detail section taken along line 10—10 also of Figure 7. Figure 10ª is a side elevation, partially in section, of the tone arm and associated parts. Figure 11 is a diagrammatic perspective view of the control mechanism of the phonograph. Figure 11ª is a section through the tone arm and is taken along line 11ª—11ª of Figure 10ª. Figures 12, 13, 14 and 15 are diagrammatic views illustrating the manner in which the lines leading from the control box to the operating mechanism are employed in the control circuit. Figure 16 is a fragmentary top plan view of the selector-controlled clutch operating mechanism. Figure 17 is a wiring diagram of the control circuit.

The automatic phonograph with which the control system is illustrated, by way of example, constitutes the subject matter of the patent to Otto A. Hokanson, No. 2,096,718, granted October 26, 1937. In general it comprises a table upon which the records are arranged in a stack, a tone arm which is mounted to swing in a horizontal plane and which is adapted to be lowered into engagement with the selected record as it approaches a playing position and lifted out of engagement with the record as it is returned to its original position after the record has been played; a selector-elevating mechanism for raising the turntable to positions which are predetermined and which correspond to the particular records; mechanism which comes into play after the turntable has been moved to the position which corresponds to the record to be played and which is operative to further raise those records in the stack above the one selected for play thereby to separate the stack into upper and lower sections to provide a clearance for the tone arm during the playing of the record; selector members for causing the machine to play the desired records; and means for restoring the parts to their original position when the selected records have been played.

As illustrated, the phonograph includes a chassis 21 upon which the working parts are mounted and which, in practice, is housed in a cabinet of appropriate design. The turntable, indicated generally at 22, is mounted on an upright spindle 23 (Figure 3). The lower end 24 of the latter is keyed or feathered to a revolving sleeve 25 which is supported in an upright bearing 26. The said bearing is mounted upon the bottom wall of the chassis and provides a journal for a gear 27 which meshes with a drive pinion 28 secured to the shaft 29 of an electric motor 30. The lower end 24 of the spindle may be hollow, as shown, to receive a spring 31 which serves to cushion the movement of the turntable to its lowered position. The upper end 32 of the spindle constitutes a guide post for the records 33, the latter being carried in suitable trays 34. The peripheral edges 35 of the said trays are beveled, thereby providing overhanging shoulders 36. As shown in Figures 1 and 3, the records are arranged in a stack upon, and are normally supported by the turntable. During selection and playing of a record, however (other than the top one) certain of them are moved upwardly away from the turntable, being returned to their normal positions when the selected record has been played. During such movement of the records they are guided by the upper end of the spindle 23.

Means is provided for elevating the turntable to various heights in accordance with the record selected to be played and for lowering the turntable after the record has been played. The said means includes a collar 37. The latter supports the turntable upon the spindle and is formed with a flared lower end which fits over the upper end of a sleeve 37a carried by the gear 27. An actuating lever 38 (Figure 2) is mounted upon the chassis 21, the outer end of the said lever being supported for sliding and pivotal movements in a bracket 39 and the inner end being forked to straddle the sleeve 37a and engage the lower end of the collar 37. Intermediate its ends the lever carries a roller 40 which rests upon a cylindrical elevating cam 41. The said cam includes a sleeve-like body 42 and is mounted upon a shaft 43 which is driven at predetermined intervals in the cycle of operations of the machine to elevate the turntable to predetermined record playing elevations. Motion is transmitted to the cam shaft 43 from the motor shaft 29 through the medium of a gear 44 mounted on an upright stub shaft 45, there being a bevel gear 46 on the latter which meshes with a similar gear 47 carried by a horizontal shaft 48. A clutch-controlled gear 49 is loosely mounted on the shaft 48. The said gear meshes with a similar gear 50 fixed on one end of a counter shaft 51, the said shaft carrying a worm 52 which meshes with a worm wheel 53 fixed to the cam shaft 43. A sliding clutch collar 54 is keyed to the shaft 48 and is actuated by a clutch lever 55 to connect the gear 49 to the said shaft and thereby drive the cam shaft 43.

The invention contemplates the association with the machine of a control system which will enable selective playing of the records from a remote point. The system, as illustrated, includes selector switches 56, 57, 58, 59, 60, 61, 62, 63, 64 and 65 (Figure 17), one of which is identified with each of the records 33 and each of which includes a pair of spaced resilient contact members. The said switches are preferably mounted in a control box 66 (Figures 5 and 6) and are normally open. They may be closed by depressing buttons 67. The latter are carried by bars 68 which are mounted for lengthwise movement in suitable guide openings formed in plates 69 and 70 and they project through suitable openings formed in the front panel 71 of the box. The inner ends of the bars 68 carry insulating heads 72 to which conducting tips 73 are secured, the said bars normally occupying positions in which the conducting tips are spaced from the associated resilient contact members. It will be apparent that by moving any one of the buttons 67 to the full-line position shown in Figure 5, the tip of the associated bar 68 will be forced between, and hence will connect, the ends of the resilient contact members. The conducting tips 73 of the movable members of the switches may, as illustrated, be formed with indentations 74 which the ends of the resilient contact members enter. A good contact is thus provided which is maintained until the movable member of the switch is restored to its original position.

Referring to Figure 17, it will be noted that the closing of switch 56 connects lines $a$ and $b$ of the remote control system, the closing of switch 57 connects lines $a$ and $c$; the closing of switch 58 connects lines $a$ and $d$; the closing of the switch 59 connects lines $a$ and $e$; the closing of switch 60 connects lines $a$ and $f$; the closing of switch 61 connects lines $b$ and $c$; the closing of switch 62 connects lines $b$ and $d$; the closing of switch 63 connects lines $b$ and $e$; the closing of switch 64 connects lines $b$ and $f$; and the closing of switch 65 connects lines $c$ and $d$. The pairs of lines thus provided are adapted to close a control circuit hereinafter described. It will be noted that the switches 56, 57, 58, 59 and 60 all make use of the line $a$; that the switches 56, 61, 62, 63 and 64 make use of the line $b$; that the switches 57, 61 and 65 make use of the line $c$; that the switches 58, 62 and 65 make use of the line $d$; that the switches 59 and 63 make use of the line $e$; and that the switches 60 and 64 make use of the line $f$. In other words, the six lines are adequate for the provision of ten pairs of control lines. Five additional pairs of control lines may also be furnished by the same lines in the event that provision is made for fifteen record selections instead of ten. The switches of the five additional pairs of control lines are indicated by dotted lines at 75, 76, 77, 78 and 79. Line $c$ would be connected to switches 75 and 76; line $d$ would be connected to switches 75, 77 and 78; line $e$ would be connected to switches 77 and 79; and line $f$ would be connected to the switches 76, 78 and 79. The lines $a$, $b$, $c$, $d$, $e$ and $f$ are connected, respectively, to brushes 80, 81, 82, 83, 84 and 85. The said brushes are supported by a holder 86 (Figure 7) against the periphery of a rotary contactor 87. The latter comprises a disc 88 of any suitable insulating material and is formed with a hub 89 (Figure 9) by which the said disc is mounted upon a vertical stub shaft 90. The latter carries a gear 91 which meshes with a worm 92 on the end of the counter shaft 51. The rotary contactor is driven by the shaft 51.

The upper face of the contactor 87 carries a contact ring 93 while the lower face carries a contact ring 94 both of the said rings being embedded in the disc 88 with their peripheral edges spaced from the periphery of the disc. The ring 93 is formed with tongues 95 which are bent at right angles with respect to the body portion of the ring and which are embedded in the periphery of the disc 88. The ring 94, on the other hand, is formed with tongues 96 which are bent at right angles with respect to its body portion and which are likewise embedded in the periphery of the disc. As the contactor 87 rotates, therefore, the tongues 95 and 96 of the rings 93 and 94, respectively, are moved under the brushes 80, 81, 82, 83, 84 and 85. Adjacent its inner marginal edge the ring 93 is formed with a circular series of openings 97 (Figure 7) which provide radial contact strips 1a, 2a, 3a, 4a, 5a, 6a, 7a, 8a, 9a, and 10a. The said strips are contacted successively, as the contactor is rotated, by a brush 98 which is carried by the holder 83, a brush 99 (Figure 9) which is located at the opposite side of the contactor contacting the ring 94. In this connection it will be noted that the brush 99 is in continuous engagement with the ring 94; that the brush 98 is in intermittent engagement with the contact strips 1a, 2a, 3a, 4a, 5a, 6a, 7a, 8a, 9a and 10a of the ring 93; and that the brushes 80, 81, 82, 83, 84 and 85 are in intermittent contact with the tongues 95 and 96 of the said rings. To complete the control circuit one of the brushes 80, 81, 82, 83, 84 and 85 must contact a predetermined one of the tongues 95, another of the said brushes must contact a predetermined one of the tongues 96 while the brush 98 must contact a predetermined one of the strips 1a, 2a, 3a, 4a, 5a, 6a, 7a, 8a, 9a and 10a. The tongues 95 and 96 and the said contact strips are so spaced that the contactor must be moved to a different predetermined angular position to complete the control circuit through each one of the selector switches. As a different one of the contact strips 1a, 2a, 3a, 4a, 5a, 6a, 7a, 8a, 9a and 10a is connected in series with each of the selector switches, no two operative positions of the contactor will be alike. In other words, not only must the particular pair of the brushes 80, 81, 82, 83, 84 and 85 contact with the proper tongues 95 and 96 but the brush 98 must contact with the proper one of the strips 1a, 2a, 3a, 4a, 5a, 6a, 7a, 8a, 9a and 10a. Thus, although the pair of brushes which are to be utilized in the closing of the control circuit may contact various of the tongues 95 and 96 during movement of the contactor to the angular position predetermined by the particular selector switch which is closed, the control circuit will not be closed until the brush 98 engages the proper one of the strips 1a, 2a, 3a, 4a, 5a, 6a, 7a, 8a, 9a and 10a. It is understood, of course, that in the event fifteen record selections are provided the contactor will be modified accordingly.

The control box may also, as illustrated, include a conventional coin-actuated switch 100 (Figure 17). The said switch is normally open, being closed when a coin (indicated at 101) is inserted in a coin slot provided for this purpose. One side of the switch 100 is connected by a wire 102 to a wire 103 which in turn is connected to one side of the motor 30. The other side of the said motor is connected by a wire 104 to one side of the primary of a transformer 105, the other side of the latter being connected by wires 106, 107, 108 and 109 to the wire f. A wire 110 connects the last mentioned wire to the other side of the switch 100.

When it is desired to play a record a coin is inserted in the proper slot. This closes the switch 100 and current is applied to the motor 30. The clutch collar 54 at the completion of each cycle of operations is moved to the position in which it connects the gear 49 to the shaft 48. Hence upon closing of the switch 100 in the manner described the counter shaft 51 is rotated, thereby simultaneously rotating the cam 41 and the contactor 87. Assuming that at the outset the selection button which closes the switch 62 has been depressed, then the contactor will rotate to the position shown in Figures 7 and 17. When it reaches this position the brush 81 contacts a tongue 95 of the ring 94; the brush 83 contacts a tongue 95 of the ring 93 and the brush 98 contacts the contact strip 7a of the ring 93. The brush 98 is connected by a wire 110a (Figure 17) to one side of a normally open switch 111, the other side of the said switch being connected through solenoids 112 to a line 113. The latter is connected to one side of a secondary 114 of the transformer 105, the other side of that said secondary being connected to a wire 115 which is grounded as indicated at 116. As the brushes 98 and 83 are electrically connected by the ring 93, the brush 98 will be connected through the brush 83 to the line d. The switch 62 is closed. Hence the line d will be connected to the line b, the latter being connected by brush 81 to the ring 94, which ring is connected by the brush 99 to a ground wire 117 (Figure 9). As the contactor reaches the angular position shown, the switch 111 is closed by an arm 118 which is fixed to the counter shaft 51, it being noted in this connection that the said shaft makes one revolution as the contactor moves from one angular position to the succeeding one. The switch 111 is closed, therefore, to complete a circuit through the solenoids 112 in the manner described as the contactor moves to each position which corresponds to a playing position of the turntable. The circuit thus completed has been heretofore, and will hereinafter, be referred to for convenience as the control circuit.

When the solenoids 112 are energized they are operative, through the agency of an armature 119 (Figures 11 and 16) and a lever 120 by which the armature is carried, to move a trip arm 121 to an extended position (see dotted line position in Figure 16), the said lever and trip arm being pivotally mounted upon a fulcrum plate 122 which in turn is pivotally mounted upon an upright pin 123. When the trip arm occupies the position described its free end lies in the path traversed by a tappet pin 124 which is carried by the hub of the gear 46. When this pin encounters the free end of the trip arm, as shown in Figure 16, it swings said arm further to engage and move lengthwise a shifting bar 125 connected to the clutch-actuating lever 55 and shifts the clutch collar 54 out of driving engagement with the gear 49 to arrest rotation of the countershaft 51 and its associated parts and bring the turntable to rest at an elevation required for the playing of the selected record, it being noted that as the clutch-actuating lever 55 is moved in the manner described the arm 118 releases the engaged member of the switch 111 and permits the latter to open and break the control circuit. A spring 126 serves to normally retain the armature-carrying lever 120 in a retracted position in which the free end of the trip arm is held out of the path of the tappet pin 124.

The movement of the trip arm 121 in the manner described shifts the clutch collar 54 into engagement with a gear 127 (Figure 2) which is loosely mounted on the shaft 48 and which meshes with a gear 128 carried by a countershaft 129. A worm 130 is also mounted on the said countershaft, the said worm meshing with a worm wheel 131 (see also Figure 1) which is fixed to the lower end of shaft 132.

A cam 132a which is fixed to the upper end of the said shaft is utilized to actuate pairs of upright supporting arms 133 (Figure 3) which are adapted, after the turntable has been elevated to the proper height, to be automatically brought into engagement with those records above the one selected for play to elevate them to provide a clearance for the tone arm 134 and thereafter automatically lowered and subsequently released after the playing of the selected record and before the selection of another record. Each pair of supporting arms constitutes part of an upright U-shaped bar 135 pivoted to rock about a horizontal axis in a frame 136 which is channel-shape in cross section. Connected to leg portions 137 of the frames 136 to raise and lower them are elevating units which, as illustrated, are in the form of crossed levers 138 pivotally connected to one another intermediate their ends at 139 and slidingly and pivotally connected at their free ends to the frames 136 and to brackets 140a mounted upon the floor of the chassis 21.

Also connected to the ends of the web portion of the frames 136 are similar crossed levers 140 (Figures 1 and 2) which are pivotally connected intermediate their ends as at 141 and are slidingly and pivotally joined at their free ends to extensions 142 formed on one set of the brackets 140ª. By this construction, as the sets of levers 138 and 140 are expanded and contracted, the record engaging arms are simultaneously raised and lowered as a unit, the levers acting in the fashion of lazy tongs. The pin 141 by which the levers 140 are connected carries a roller 143 which engages a substantially spiral-shaped groove 143ª formed in the cam 132ª. Hence when the clutch collar 54 is coupled with the gear 127, motion is transmitted to the cam shaft 132 to cause the crossed levers to expand, pause, and then contract and accordingly raise and lower the record supporting arms 133.

In the lowered retracted position of the supporting arms 133 (see dotted line position in Figure 3) the toothed record-engaging portions 144 thereof assume a definite predetermined elevation relative to the horizontal plane of movement of the tone arm 134, the top record of the stack being below that elevation so that when the turntable is elevated to a predetermined height to play a selected record, the upwardly facing shoulders of the teeth 144 will be so disposed as to be in a plane substantially at or somewhat below the top surface of the record to be played, whereby when the arms 133 are rocked inwardly they will engage the peripheral edge shoulder 36 of the record tray immediately above the selected record and upon expansion of the crossed lever 138 and 140 the records supported by them will be elevated to provide an operating clearance for the tone arm 134. The means for rocking the bar 135, after the selected record has been brought to its playing position, consists of actuating extensions 145 (Figure 3) secured at their upper ends to the rock bar and provided at their lower ends with follower-pins 146 which are adapted to engage upright cam bars 147. In the lowered positions of the frames 136, these follower-pins contact the companion cams below their shoulders 148, at which time the record-engaging arms 133 are in their retracted positions and free from engagement with the peripheral edges of the record trays. Immediately upon the upward movement of the frames 136, the actuating extensions 145 are swung outwardly, owing to the expansion of the levers 138 and 140, and the record-engaging arms swung inwardly into engagement with the lower peripheral edge of the record tray of that record immediately above the one to be played. The said arms remain in the positions described until the crossed levers are actuated to return the elevated records to their place upon the turntable, the arms 133 being pivoted out of engagement with the records as the follower-pins move behind the shoulders 148 of the cam bar 147.

The shaft 132 also carries a cam 149 (Figure 11). Pivoted at 150 alongside this cam and in bearing contact therewith is a horizontally swinging lever 151 which is formed with a shoulder 152 for cooperating engagement with deep and shallow notches 153 and 154, respectively, the said lever being held in engagement with the said cam by a spring 151ª. At its free end the lever 151 has pivotally connected thereto a bar 155 whose free end is reduced in width to provide a shoulder 156 which abuts a depending portion of the clutch-shifting lever 55. It will be apparent that when the clutch collar is moved into engagement with the gear 127 the clutch lever 55 will move the bar 155 to pivot the lever 151 away from the cam 149 against the action of the spring 151ª. Upon release of the trip arm 121 by the tappet pin 124, however, the spring 151ª again moves the lever 151 against the cam 149. In the meantime, however, the said cam has moved through an angular distance which brings an elevated position 157 thereof opposite the shoulder 152. This elevated portion of the cam is operative to hold the bar 155 in a position which will permit a spring 158 to hold the clutch lever 55 in the position to which it is moved by the trip arm 121. The clutch collar remains in engagement with the gear 127 until the levers 138 and 140 complete the elevating movement of those records above the one selected for play. As this movement is completed, the shouldder 152 of the lever 151 drops into the shallow notch 154 of the cam 149, thereby disengaging the clutch collar 54 from the gear 127 and moving it to a neutral position. At this stage, therefore, the turntable has been moved to a position in which the selected record is supported in the plane in which it is to be played and the records above it have been elevated to provide the necessary clearance for the tone arm 134.

Mechanism is provided for actuating the tone arm 134 to bring it into playing position over the record selected for play, after the turntable has been elevated and the stack of records split above the one selected as heretofore described, and for returning the tone arm to its original position after the selected record has been played. The said means includes an upright post 159 (Figure 1) about which the tone arm swings in a predetermined horizontal plane, the said tone arm being pivoted to swing vertically about a pin 160 carried by a stem 161 which is mounted for rotary movement in the upper end of the post. The vertical swinging movement of the tone arm is for the purpose of bringing its reproducing needle 162ª into engagement with the record for play and out of engagement with it during the return movement of the tone arm after the record has been played. Forward of its pivot 160, the tone arm is provided with a depending brace or stay bar 162 which serves to hold the tone arm in its upwardly tilted position. The said brace or stay bar has a lower end which, in the non-playing position of the tone arm (at one side of the turntable), is located between a fixed radial stop 163 (Figure 11ª) and a yieldable stop 164, the latter being pivoted at 165 and cooperating with a spring 166 which acts at a predetermined time to force the tone arm inwardly into position over the sound groove of the record to be played. At its lower end, the depending stay bar has an offset lug 167 provided with a projection 167ª which is adapted to control the closing of a switch 168 when the tone arm reaches the end of the playing position. This switch is disposed alongside the post 159 and is in an electric circuit which includes a solenoid 169 and which derives power from the secondary of the transformer 105 when the switch 168 is closed at the end of the playing of the record, the solenoid 169 is energized and a plunger 170 associated with it is projected to swing the bar 155 out of engagement with the clutch lever 55, whereupon the spring 158 is automatically operative to shift the clutch collar 54 into engagement with the gear 127 to transmit motion to the cam shaft 132 which controls the raising and lowering of the record elevating arms 133. Also mounted on the cam shaft 132 is a cam 171 (Figure 4ª) for controlling the return swinging movement of the tone arm to its original position at a time prior to that at which the cam 132ª retracts the crossed levers 138 and 140 to lower the records above the one selected for play upon the latter. For this purpose the cam 171 has an inwardly and outwardly directed groove 172 for accommodating a roller 173 which is carried by a horizontally-swinging lever 174 pivoted at 175. The outer end of the lever 174 is connected by a link 176 with an arm 177 which is carried by a sleeve 178 rotatably mounted on the post 159. This sleeve is provided with a substantially semi-circular cam surface 179 with which the lower end of a pendant yoke 180 cooperates, the said yoke being pivotally connected to the post 159 and being swung outwardly by the cam 179 to engage a projection 181 on the lower end of the stay bar and through the agency of the latter swing the tone arm upwardly about its pivot 160 to bring the needle 162ª clear of the record. In this connection it will be noted that the stop 163 which is associated with the stay bar 162 of the tone arm is attached to the sleeve 178 while the yieldable stop 164 is attached to a supporting bracket 182 which is secured to the post 159.

From the foregoing it will be apparent that when the turntable is elevated to play a selected record and the records above the one selected for play further raised, the tone arm occupies its outwardly-swung and upwardly-tilted position owing to the engagement of the lower end of the yoke 180 with the cam 179 and the projection 181 carried by the stay bar 162. During the final part of the upward movement of the records above the one selected for play (to provide a clearance for the tone arm), the ingress portion 183 (Figure 4ª) of the groove 172 of the cam 171 encounters the roller 173 on the lever 174 and swings the latter in a direction to turn the sleeve 178 so that the stop 163 thereof is moved away from the stay bar 162 of the tone arm, thereby permitting the spring pressed stop 164 to act on said bar to force the tone arm inwardly over the record to starting position for play. Simultaneously with this movement, the cam is released from the pendant yoke 180 and the tone arm is allowed to drop by gravity to bring its needle into engagement with the sound groove of the record. Referring to Figure 4ª it will be noted that during the playing of the record the roller 173 of the lever 174 assumes a position in the innermost or crotch position of the cam groove 172 so that when the elevated portion of the record stack is lowered after the playing of the selected record, the lever 174 will be swung in the opposite direction, by reason of the roller 173 traversing the egress portion 184 of the cam groove. Hence the tone arm is first swung upwardly to bring the needle clear of the record and thereafter swung to its non-playing position.

When the records above the one which has been selected for play are lowered upon the latter the shoulder 152 on the lever 151 drops into the deep notch 153 in the cam 149 to move the clutch collar 54 into engagement with the gear 127. The latter, therefore, is rotated to lower the turntable to its original position.

It will be noted that the motor 30 (Figure 17) is adapted to be connected directly across the main lines of the power circuit by a switch 185. This switch is held open at the outset by a pin 186 which is carried by the worm wheel 53 on the cam shaft 43. When a coin is deposited, however, and the coin switch 100 is closed to energize the motor and start rotation of the shaft 43, the pin 186 passes out of the path of the movable member of the switch and a spring 187 moves the said member into engagement with the companion member. The switch 185 remains closed until the turntable 22 is returned to its original position upon completion of its playing of the selected record. As the turntable approaches such position the pin 186 again comes into engagement with the movable member of the switch and moves the latter to open the said switch and stop the motor 30, it being understood that prior to the opening of the switch 185 in the manner described the coin 101 has been acted upon to permit opening of the switch 100.

In order to effect the automatic return of the selector buttons 67 of the control box to their normal positions a solenoid 188 is arranged in the said box, the casing 189 (Figure 6) of the latter being mounted upon the plate 70. An armature 190 which is associated with the solenoid is connected by a pin 191 to the lower ends of a pair of links 192. The said links are pivotally mounted intermediate their ends upon a shaft 193 which is supported upon the wall 70 of the control box by a lug 194, the upper ends of the links 192 carrying a rock member 195 which is located behind depending projections 196 formed upon the under edges of the bars 68. When a selection button is depressed to close the associated switch the inward movement of the bar 68 is transmitted to the rock member 195 and the latter is moved to the full-line position shown in Figure 5.

Energization of the solenoid to move the armature 190 in a direction which will, through the agency of the links 192 and the rock member 195, restore the buttons 67 to their original positions, is preferably effected automatically by a switch 197 (Figure 17). The said switch is normally open, the movable member thereof being held out of engagement with the companion member by a spring 198. The stationary member of the switch 197 is connected by a wire 199 to the wire e to which one side of the solenoid 188 is connected by a wire 200. The other side of the said solenoid is connected to the stationary member of a switch 201. The movable member of the latter is also the movable member of the switch 100, being normally held in engagement with the stationary member of the switch 201 when not being held in engagement with the stationary member of the switch 100 by a coin. The movable member of the switch 201 is connected by the wire 110 to the wire f, the latter being connected by the wire 109 to one side of a secondary 202 of the transformer 105. The other side of the said secondary is connected by a wire 203 to the movable member of the switch 197.

The movable member of the switch 197 is so arranged with relation to the pin 186 that as the turntable is being lowered to its original position after the playing of a record (after the coin switch 100 has been opened and the solenoid switch 201 closed but before the motor switch 185 is opened) the pin 186 engages a projection 204 (Figure 17) on the movable member of the switch 197 and closes it to momentarily energize the solenoid 188 and effect the restoration of the selector buttons 67 to their normal positions, the switch being again opened as the pin 186 moves beyond and releases the projection 204.

Preferably the armature of the solenoid 188 is formed or provided with an extension 205 (Figures 5 and 6). The extension projects through a suitable opening formed in the front panel of the control box and carries a button 206 which may be depressed to restore the selector buttons to their normal positions.

In the event that a plurality of record selections are made at the same time the sequence of operations described will be repeated until all of the records have been played. The selector buttons will, of course, be restored to their normal positions upon completion of the playing of the selected records.

The control system is illustrated and described in connection with the selection and playing of the fourth record (from the bottom) in the stack, the playing of this record being effected by the closing of the switch 62. The manner in which the wires of the system are utilized in the selection and playing of other of the records is illustrated diagrammatically in Figures 12, 13, 14 and 15. The first of these figures shows the position at which the rotary contactor 87 comes to rest when the switch 56 is closed while Figure 14 shows the position at which the contactor comes to rest when the switch 60 is closed, it being noted that in both cases the wire $a$ is common to each pair of control lines. This wire is also common to the pairs of control lines corresponding to the intermediate positions of the contactor and which are connected by the switches 57, 58 and 59. In other words, the wire $a$ is included in five pairs of control lines. Figure 13 shows the first position of the rotary contactor in which the wire $b$ is employed as a wire common to a plurality of pairs of control lines, the said wire not only being included in the lines connected by the switch 61 but also those connected by the switches 62, 63 and 64. Figure 15 shows the position at which the contactor comes to rest when the switch 65 is closed. In this position of the contactor the wire $d$ is the wire which would be common to a plurality of pairs of control lines in the event that more than ten record selections were required. In this connection it is to be understood that those wires which provide combinations which are not employed may be utilized, if desired, in other auxiliary circuits.

From the foregoing it will be apparent that the rotary contactor is operative to close the control circuit at different angular positions depending upon which of the selector switches is closed. The contactor is carried by the same shaft which drives the elevating cam of the turntable, the system being so designed that each angular position of the cam corresponds to a playing elevation of the turntable. The records, therefore, may be selectively played by the closing of the proper selector switches.

The system has been designated a remote control system and the control box has been described as being located at a remote point. It will be appreciated, however, that owing to its simplicity, the system may likewise be availed of to advantage in installations wherein the control box is mounted directly in the cabinet of the machine.

I claim as my invention:

1. A control system of the character described, comprising a mechanism to be operated, a control circuit therefor, a plurality of lines for closing said control circuit, selector switches identified with said mechanism and to which said lines are connected, certain of said lines being common to one of the contacts of a certain plurality of switches and the companion switch contacts in any one plurality of switches being connected, respectively, to the remaining lines common to the companion switch contacts in the remaining pluralities of switches, a rotary contactor, a series of brushes which engage said contactor and to which said lines are connected, and means for automatically rotating said contactor to a position in which it closes said circuit through the proper lines when one of said switches is closed.

2. A control system of the character described, comprising a mechanism to be controlled, a motor for driving said mechanism, a clutch for connecting said motor to, and disconnecting it from, said operating mechanism, a control circuit, a plurality of lines for closing said control circuit, selector switches to which said lines are connected, certain of said lines being common to one of the contacts of a certain plurality of switches and the companion switch-contacts in any one plurality of switches being connected, respectively, to the remaining lines common to the companion switch-contacts in the remaining pluralities of switches, a rotary contactor which is driven by said motor and which is operative to close said circuit through the proper lines when one of said switches is closed, and means rendered operative by the closing of said circuit for actuating said clutch.

3. A switching system of the character described, comprising a selector operating shaft, a motor for driving said shaft, a control circuit, a plurality of lines for closing said control circuit, selector switches in said circuit and to which said lines are connected, certain of said lines being common to a plurality of said switches, a rotary contactor which is driven by said shaft and which is operative at a predetermined time to selectively close said circuit through the proper lines, and means interposed between the motor and the shaft and responsive to the closing of said circuit for arresting the selective rotation of said shaft.

4. A control system of the character described, comprising a mechanism to be operated, a motor for driving said mechanism, a control circuit, a plurality of lines for closing said control circuit, selector switches identified with said mechanism and to which said lines are connected, certain of said lines being common to one of the contacts of a certain plurality of switches and the companion switch-contacts in any one plurality of switches being connected, respectively, to the remaining lines common to the companion switch-contacts in the remaining pluralities of switches, a rotary contactor having a pair of conductor rings which are insulated from one another, and a series of brushes to which said lines are connected, certain of said brushes engaging one of said rings and other of said brushes engaging the other of said rings, said contactor being automatically operative to close said circuit through the proper lines when one of said switches is closed.

5. A control system of the character described, comprising a mechanism to be operated, a motor for driving said mechanism, a clutch for connecting said motor to, and disconnecting it from, said operating mechanism, a plurality of control lines, selector switches identified with said mechanism and to which said lines are connected, certain of said lines being common to one of the contacts of a certain plurality of switches and the companion switch-contacts in any one plurality of switches being connected, respectively, to the remaining lines common to the companion switch-contacts in the remaining pluralities of switches, a rotary contactor having a pair of conductor rings which are insulated from one another, a series of brushes to which said lines are connected, certain of said brushes engaging one of said rings and other of said brushes engaging the other of said rings, means including a solenoid for operating said clutch, and a normally open control circuit in which said solenoid is included, one side of said control circuit being connected to one of said rings by a brush while the other side is connected to the other of said rings by another brush, said contactor being automatically operative to close said control circuit through the proper lines at different angular positions depending upon which of said switches is closed.

6. A switching system of the character described, comprising a selector operating shaft, a motor for driving said shaft, a clutch for connecting said motor to, and disconnecting it from, said shaft, means including a solenoid for operating said clutch, a normally open control circuit in which said solenoid is included, a plurality of lines, selector switches to which said lines are connected, certain of said lines being common to one of the contacts of a certain plurality of switches and the companion switch-contacts in any one plurality of switches being connected, respectively, to the remaining lines common to the companion switch-contacts in the remaining pluralities of switches, and a rotary contactor which is adapted to close said control circuit through said lines at different angular positions depending upon which of said switches is closed, each angular position of said contactor corresponding to a predetermined selective governing position of said shaft.

7. A control system of the character described, comprising a motor, a normally opened control circuit, a plurality of lines for closing said circuit, a plurality of groups of selector switches connected to said lines, certain of said lines being common to one of the contacts of the switches comprised in any one group, and the companion switch contacts in any one group being connected, respectively, to the remaining lines common to the companion switch contacts of the remaining group of switches, and a contactor drivingly connected to the motor and automatically operative to close said circuit through said lines for different positions depending upon which of said switches is closed.

8. A selector switching system of the character described, comprising a control circuit, a plurality of lines for closing said circuit, selector switches connected to said lines, certain of said lines being common to one of the contacts of a certain plurality of switches and the companion switch contacts in any one plurality of switches being connected, respectively, to the remaining lines common to the companion switch contacts in the remaining pluralities of switches, and a rotatable contactor operative to close said circuit through said lines at different angular positions, each position of said contactor corresponding to a selective setting position.

9. A selector switching system of the character described, comprising a control circuit, a plurality of lines for closing said circuit, a plurality of groups of selector switches connected to said lines, certain of said lines being common to one of the contacts of the switches comprised in any one group and the companion switch contacts in any one group being connected, respectively, to the remaining lines common to the companion switch contacts of the remaining groups of switches, means for automatically closing said circuit through the proper lines when one of said switches is closed, and means for automatically restoring said switches to their normally open position.

EDWARD A. EBERT.